United States Patent [19]

Taylor

[11] 4,028,761
[45] June 14, 1977

[54] MULTIPURPOSE SLIDE

[75] Inventor: John Taylor, Long Beach, Calif.

[73] Assignee: Born Free Plastics, Inc., Gardena, Calif.

[22] Filed: Oct. 9, 1975

[21] Appl. No.: 621,235

Related U.S. Application Data

[63] Continuation of Ser. No. 453,709, March 28, 1974, abandoned.

[52] U.S. Cl. .................................. 9/310 B; 280/18
[51] Int. Cl.² ................... A63C 5/02; A63C 15/12
[58] Field of Search ........... 9/310 B, 310 A, 310 E, 9/310 F, 310 AA, 6 P, 310 R; 280/18; D34/42, 40, 41, 43

[56] References Cited

UNITED STATES PATENTS

| | | | |
|---|---|---|---|
| 2,802,222 | 8/1957 | Chapman | D34/43 X |
| 3,384,910 | 5/1968 | Heston et al. | 9/310 B |
| 3,689,092 | 9/1972 | Lake | 9/310 R X |

FOREIGN PATENTS OR APPLICATIONS

| | | | |
|---|---|---|---|
| 1,352,973 | 1/1964 | France | 9/310 R |
| 1,964,299 | 6/1971 | Germany | 280/18 |

Primary Examiner—Trygve M. Blix
Assistant Examiner—Gregory W. O'Connor

[57] ABSTRACT

A multipurpose slide for supporting a human passenger during water and snow sports activities. The board has an enlongated, foam filled, seamless body of blow molded polyethylene. The top wall has formed therein a knee well to serve as a cockpit for the passenger, with the bottom of the knee well being covered with a foam pad. A strap passing through the body is used to secure the passenger to the surfboard. The bottom wall, or hull is formed such that the slide may be ridden forward, backward or maneuvered through spins or other similar maneuvers.

13 Claims, 7 Drawing Figures

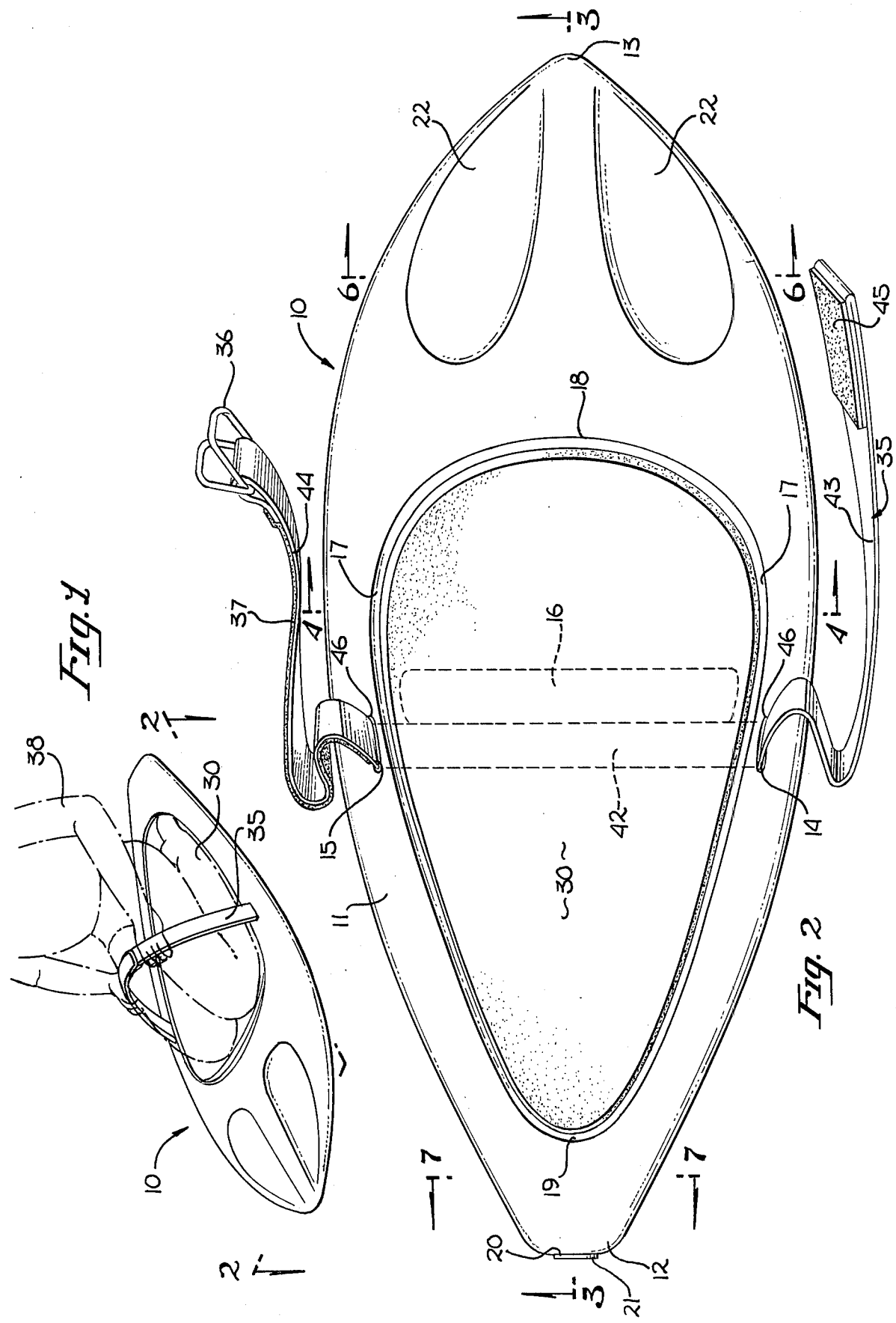

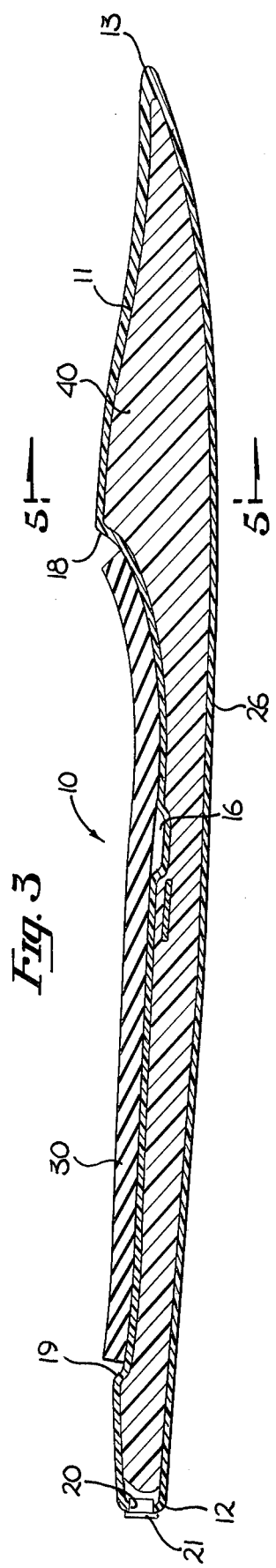
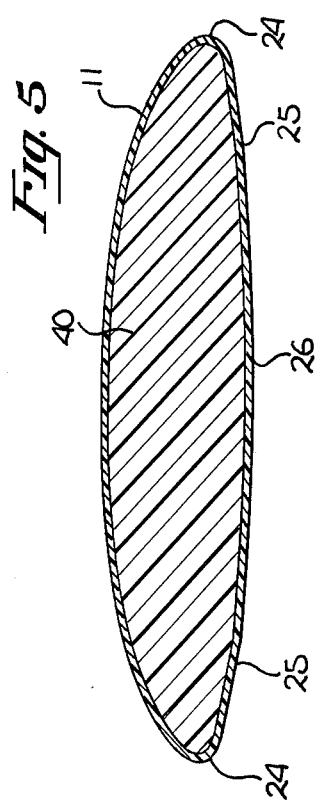
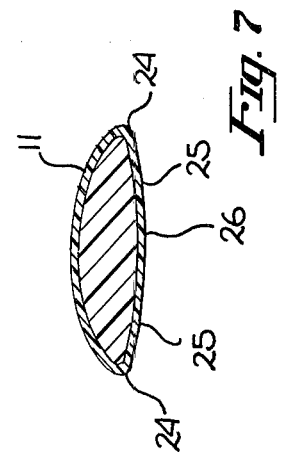
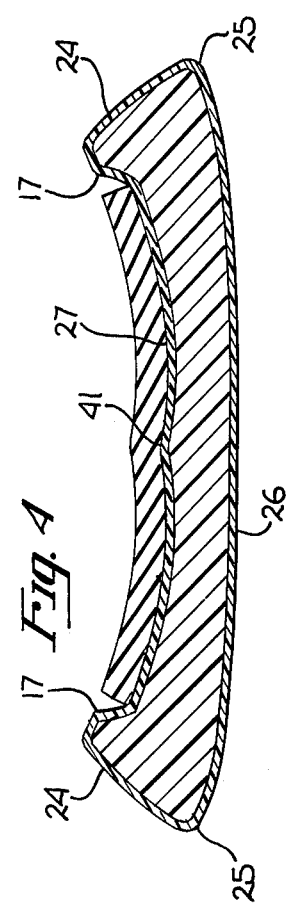
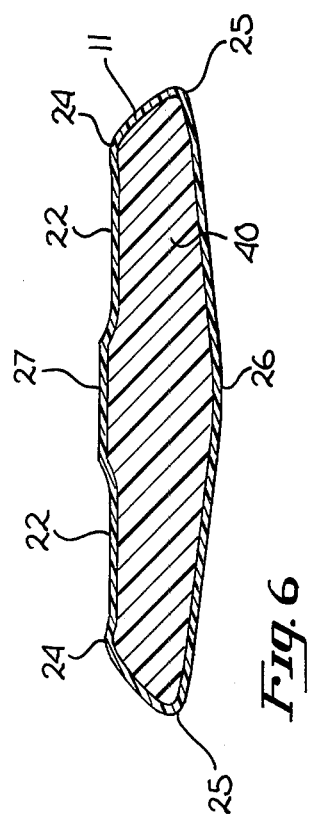

MULTIPURPOSE SLIDE

This is a continuation, of application Ser. No. 453,709 filed Mar. 28, 1974, now abandoned.

BACKGROUND OF THE INVENTION

1. Field of the Invention

This invention relates to slides, and particularly to a type of slide for supporting a human passenger in the kneeling position during sports activity on water or during skiing activity on sand, snow or other suitable media.

2. Prior Art

Prior art surfboards are generally comprised of a fiberglass outer covering on a preshaped foam center core. Such construction is relatively expensive because of the amount of hardwood required, caused in part by the materials used and at least in part by the fact that generally the outer surface is not a mold surface so that considerable finishing is required. When prior art surfboards are reduced to a small size for carrying a kneeling passenger, such as employed in the presently preferred embodiment, they do not provide sufficient buoyancy to support an average teenage or adult passenger. Also, because of the hard surface of prior art surfboards such devices are impractical to use safely in the kneeling position over more abrasive and less yieldable surfaces such as sand or snow covered ground. In addition, the hulls of the prior art do not permit the board to be ridden backwards or sidewards, and if any turning is attempted the board will flip over or "wipe out."

SUMMARY OF THE INVENTION

A multipurpose slide for supporting a human passenger in the kneeling position during water and snow sports activity is disclosed. The slide is comprised of an elongated, foam filled, structurally semi-rigid body of blow molded polyethelyne, having top and bottom walls meeting at rounded edges. The bottom is formed having a compound curve, is chamfered near the rounded edges, and tapers to form pointed ends. A knee well impression is formed in the top wall and extends approximately along the rear two thirds of the length of the body for accommodating the passenger's knees and legs. The well has a depth approximately equal to one quarter of the thickness of the body, and a foam pad is affixed therein. The passenger is held to the slide by a strap which can be secured across the passenger's knees. The strap is disposed through a slot in the top wall of one side of the knee well and extends beneath the top wall and projects from a slot in the top wall formed on the opposite side of the knee well. Although the invention is primarily employed to transport a passenger in the kneeling position, it may easily be ridden in the standing position. The invention is referred to as a multipurpose slide rather than a surfboard, as it is used more frequently by towing behind power boats and snowmobiles than in the surf.

BRIEF DESCRIPTION OF THE DRAWINGS

FIG. 1 is perspective view showing the slide having a kneeling passenger thereon;

FIG. 2 is a top view of the presently preferred form of the invention;

FIG. 3 is a longitudinal cross sectional view of the slide taken along line 3—3 of FIG. 2;

FIG. 4 is a tranverse sectional view taken along line 4—4 of FIG. 2;

FIG. 5 is a tranverse sectional view taken along line 5—5 of FIG. 3;

FIG. 6 is a tranverse sectional view taken along line 6—6 of FIG. 2;

FIG. 7 is a tranverse sectional view taken along line 7—7 of FIG. 2.

DETAILED DESCRIPTION OF THE PREFERRED EMBODIMENT

As seen in FIG. 1, the slide 10 of the present invention is illustrated supporting a kneeling human passenger 38. However, the slide or board may equally as well be ridden in the standing position, though in the presently preferred form, the board is particularly adapted to be ridden in the kneeling position and will be described as though used in that fashion. The passenger is secured to the board by a belt 35 which is capable of being disposed over the passenger's bended knees, or perhaps more accurately over the passengers thighs, and is supported by a knee well 27 which is shaped to accomodate the knees and legs of the passenger. This maneuverable slide permits a passenger to jump wakes, waves or undulations, turn in a circular motion and shift his body weight to manipulate turns, spins and jumps with relative ease and safety. The board may be used in the surf, it may be towed by a power vehicle, or it may be used in snow for sledding down an incline. If the surfboard is used for surfing in the standing position, a skag may be added to its bottom.

The board 10 of the present invention has a general configuration of a conventional surfboard but is of relatively small size and is generally pointed at both ends in order to accomodate this sports activity. In the presently preferred form, it has an overall length of approximately 48 inches, an overall width of approximately 21 inches and a maximum thickness of approximately 4 inches. Under these circumstances, and considering the nature of the sports activity, it is of importance that the board be light in weight so as to enhance its floatation in water as well as its usability on sand or snow. With construction in accordance with the preferred embodiment of the invention, the board is light in weight, strong and resistant to high impact.

Referring now to FIGS. 2 through 7, the board of the presently preferred embodiment is shown comprising an elongated, foam filled, structurally semi-rigid seamless body of blow molded polyethylene. While the board may be formed from fiberglass or any other suitable alternative materials, a blow molded shell is preferred as the desired shell may be accurately formed in a single operation. Foam filling assures both flotation and strength in the finished board. The body has spaced apart top and bottom walls 11, 26 which integrally join around rounded edge 24 of the body so that the transverse section of the body, for example as illustrated in FIGS. 4 through 7, is in a closed seamless loop. This, in conjunction with the choice of the appropriate wall thickness, one-eighth to three-eighths inches in presently preferred embodiment, assures the necessary structural rigidity of the shell. Being seamless and foam filled the body can withstand repeated shock and vibration forces and other abuse without rupturing. The foam 40 which fills the enclosed cavity adds to the ability of the walls to resist the impact loads, and minimizes any effects of an inadvertant puncture.

The bottom or hull of the body is formed in a compound curve such that the hull has a convex curve from front to back and from side to side. The hull is chamfered near the edges to provide a generally smooth transition between the hull, the round edges, and the generally pointed ends of the generally tear drop shaped body. These structural features provide strength for resisting shock forces and enable a skilled passenger to jump wakes, waves or undulations, turn in a circular motion, and manipulate turns, spins and jumps with relative ease and safety. The compound curved bottom and rounded edges will not cut into a wave causing a wipe out but will skim over the water and provide ease of maneuverability.

The board 10 has front and rear ends 13, 12 with the knee well 27 being formed in the top wall 11 of the body. The knee well 27 has a perimeter defined by a front ridge 18 formed in the top wall and extending across the body at a position located approximately one third of the length of the body from the front end thereof, and by side ridges 17 formed in the top wall and extending rearwardly from the front ridge. As best seen in FIG. 2, the side ridges merge rearwardly at the rear extremity 19 of the knee well adjacent the rear of the body, so that the entire knee well occupies approximately the rear two thirds of the body and tapers in width from front to rear in an approximate tear drop shape.

The bottom of the knee well depression formed in the top wall is concave and has a depth of approximately 1 inch, or about one quarter of the thickness of the body which is at a maximum of 4 inches in that area. A slight ridge 41 longitudinally bisects the knee well 27 such that a leg of a passenger may fit comfortably on either side of the ridge.

An external groove 16 is formed in the top wall 11 and extends transversely across the bottom of the knee well at about one third the distance from the front to the rear extremity of the knee well. The groove 16 is a shallow rectangular cross-section and sized to retain the strap in position as the foam 40 is injected into the cavity and expands to fill the cavity by foaming. This groove is not necessary however, particularly if the strap is kept taught during foaming.

The knee strap 35 in the presently preferred embodiment is a woven belt of polypropylene. It has a central portion 42 which extends continuously along and under the bottom of the knee well 27, while ends 37 and 43 project through slots 14 and 15 in the top wall on each side of the body, with a pair of 'D' rings 36 connected to end 37. The ends of the belt may be secured across the knee well and over the thighs of a kneeling passenger. A Velcro strip 44 is also disposed on end 37 and a nylon mating section 45 is disposed on end 43. Thus, the strap is tightened around the legs of a passenger by threading the strap through the D ring 36, by engaging the Velcro strip 44 to the mating end 45, or preferably both so as to retain the free end of the strap.

A pair of nylon inserts 46 are disposed in slots 14 and 15 through which the nylon strap 35 projects. The nylon inserts provide a smooth surface and minimize wear and fraying of the belt against the slots 14 and 15. Thus, the use of a belt in a single piece, the disposition of the belt beneath the top wall 11 and nylon inserts 46 all cooperate to provide a very strong and durable connection of the belt to the body consistant with durability of the blow molded body. Moreover, with the belt being positively connected in the manner described and with the re-enforcing inserts disposed in each of the slots located adjacent the respective side ridges, there is no effective intrusion into or interference with the knee well.

A neoprene foam pad 30 covers the entire surface of the knee well 27. The pad 30 has a thickness equal to or slightly greater than the minimum depth of the knee well which is approximately one inch in the presently preferred embodiment. The pad may be hot poured into the knee well and be self bonding or as in the preferred embodiment, it may be secured in position by a water proof epoxy cement. The pad not only adds needed comfort for a passenger in the kneeling position, but also enhances frictional engagement between the passenger and the board.

In an alternate embodiment, a central slot having a closed bottom may be formed in the bottom wall or hull 26 near its rear end 12. If the board is to be used exclusively in the water, and especially for surfing, a molded plastic skag or fin (not shown) of conventional configuration, may be bonded in the slot.

As best illustrated in FIG. 3, the body 10 is a closed hollow foam filled structure having a single aperture 20 formed centrally in the rear end 12 thereof and two slots 14 and 15 disposed near the knee well. The aperture 20 is closed by a removable plug 21. The plug 21 serves to retard the entry of foreign matter and water into the small rearward portion of the body which may not be fully foam filled. Should the body eventually take on water through the plug or slots, the plug may be removed and the water poured out. Prior to placing the plug 21 in position, a polyurethane liquid material is injected through aperture 20. This liquid, once in the cavity, comes in contact with air and begins to chemically react and foam. The foaming continues until normally the entire interior of the cavity is filled. After the polyurethane has foamed, it hardens and becomes a semi-rigid substance. Thus, the foam retains this semi-rigid state and adds durability by cushioning the shock forces encountered in normal use and prevents overstressing the polyethelyne body shell.

In use, the board of the invention is characterized by its providing controllability which establishes a new dimension in the nature and quality of the ride for the passenger, as boards or slides specifically adapted for towing as in water skiing are generally unknown in water sports. The knee well is shaped to encounter a slight spreading of the knees and the placement of the feet together with the knees and legs abutting the curved front and side ridges. The rearward taper of the knee well insures proper positioning on the board for balanced passenger weight distribution as well as the best orientation of the passenger relative to the board for control, while also providing position stability for the passenger during spins and similar manuevers. Furthermore, the strap location facilitates the release of the passenger from the board in the case of total loss of control or a so called wipe out, and enhances safety.

The blow molding process for forming the body is well known. In this process and through means not shown, the polyethylene is melted and extruded as a hollow molten preform between two sections of a blowing mold. The blowing mold closes around the preform and the preform, still molten, is pinched off and inflated by an air blast which forces it to fall against the inside contours of the cooled mold. When the hollow seamless body 10 thus formed has cooled enough to become solid, the mold is opened, tailings from the front and rear respectively of the body are severed, and the body is removed from the mold. The strap slots are then formed and the strap is disposed through the slots in the body and drawn tight such that it is positioned behind the depression 16 formed in the bottom of the knee well. At this point, the polyurethane foam may be injected into the cavity of the body by the method previously described. After the foam has hardened, the belt is held in position by the depression and the hardened foam, and may not be withdrawn by pulling on either end thereof. Finally, a plug is inserted into the single remaining opening in the rear of the body and the foam pad is secured to the body by using an epoxy glue. The blow molding operation of course proceeds continuously in a cyclic operation to repetively and quickly produce additional slide shells.

Thus, there has been disclosed herein a new and unique board for carrying a kneeling passenger. The board may be readily mass produced by blow molding techniques which will permit repeatable manufacture at a low cost. However, while the preferred embodiment of the present invention has been described in detail herein, it will be understood by those skilled in the art that various changes in form and detail may be made therein without departing from the spirit and scope of the invention.

I claim:

1. A slide for supporting a human passenger during water and snow sports activity, comprising:
   an elongated body having a front and rear end, said body being of seamless construction and having spaced apart top and bottom walls which join around the rounded edges of said body, the top wall of said body having a knee well formed therein for accommodating said passenger and an opening at each side of said knee well, said bottom wall having a convex compound curve shape;
   a knee strap passing through said openings and under said top wall therebetween; and
   plastic foam substantially filling said body.

2. The slide of claim 1 wherein said body is formed of blow molded polyethylene having a wall thickness of about one-eighth to three-eighths inches.

3. The slide of claim 1 wherein an insert is disposed in each of said openings around said strap.

4. The slide of claim 1 wherein said knee well is covered by a pad having a thickness about equal to the depth of said well.

5. The slide of claim 4 wherein said pad is formed from neoprene and secured to said body by an adhesive.

6. The slide of claim 1 wherein said front and rear ends are pointed, and said edges are rounded such that said slide may be easily maneuvered.

7. The slide of claim 1 wherein a pair of rings are coupled to one end of said strap as a securing means for holding said passenger.

8. The slide of claim 1 wherein a hook and loop type fastener, such as is sold under the trademark Velcro, is disposed on one end of said strap and a mating section is disposed on the opposite end of said strap as a securing means for holding said passenger.

9. A slide for supporting a human passenger in the kneeling position during water and snow sports activity, comprising an elongated, blow molded polyethylene body having front and rear ends, said body having spaced apart top and bottom walls which join around rounded edges of said body, said top wall being semi-rigid to resist against the knees of said passenger in response to impact loads attendant surfing and skiing sports activity, said body being filled with foam which is injected into said body in a liquid state, chemically reacts foaming and thereby filling said body and then hardening to at least a semi-rigid state, said top wall having a knee well depression formed therein and extending approximately along the rear two-thirds of the length of said top wall of said body for accommodating the knees and legs of said human passenger in said kneeling position, said knee well having a neoprene foam pad secured to the bottom thereof by a waterproof epoxy, and a knee strap disposed through a first slot in said body on one side of said knee well, beneath said top wall and projecting from a second slot on the opposite side of said knee well for securing across said knee well and over the bended knees of said passenger, said knee strap having a hook and loop type fastener, such as is sold under the trademark Velcro, for securing said ends of said knee strap, said bottom wall being formed in a compound curve shape.

10. The method for fabricating a board capable of supporting a human passenger during surfing and skiing sports activities, comprising the steps of:
   a. forming by blow molding an elongated body having front and rear ends and spaced apart top and bottom walls which join around the edges of said body, said bottom wall being formed in a compound curve shape;
   b. placing a strap such that it is disposed beneath and projects through said top wall on either side of said body; and
   c. subsequently filling said body with a foamed-in-place semi-rigid foam.

11. The slide of claim 1 wherein said knee well extends along approximately the rear two-thirds of the length of said top wall.

12. The method of claim 10 further including forming a knee well in said top wall for accommodating said passenger and covering said knee well with a foam pad.

13. The method for fabricating a board capable of supporting a human passenger during surfing and skiing sports activities, comprising the steps of:
   a. forming an elongated blow molded polyethylene body having a generally pointed front and rear end, said body having spaced apart top and bottom walls which join around the rounded edges of said body, said bottom wall being formed in a compound curve shape, said top wall having a knee well for accommodating said passenger, said top wall having a slot disposed therethrough on each side of said knee well;
   b. securing inserts in said slots;
   c. subsequently placing a strap such that it is disposed beneath said top wall with an end of said strap projecting from each of said slots;
   d. subsequently introducing into said body through the blow molding opening a substance which will chemically react, foam and thereby fill said body and harden to a semi-rigid state; and
   e. adhesively securing a pad to the bottom of said knee well.

* * * * *